No. 845,040. PATENTED FEB. 19, 1907.
L. P. MARTIN.
DREDGE PIN AND JOINT.
APPLICATION FILED JUNE 28, 1905.
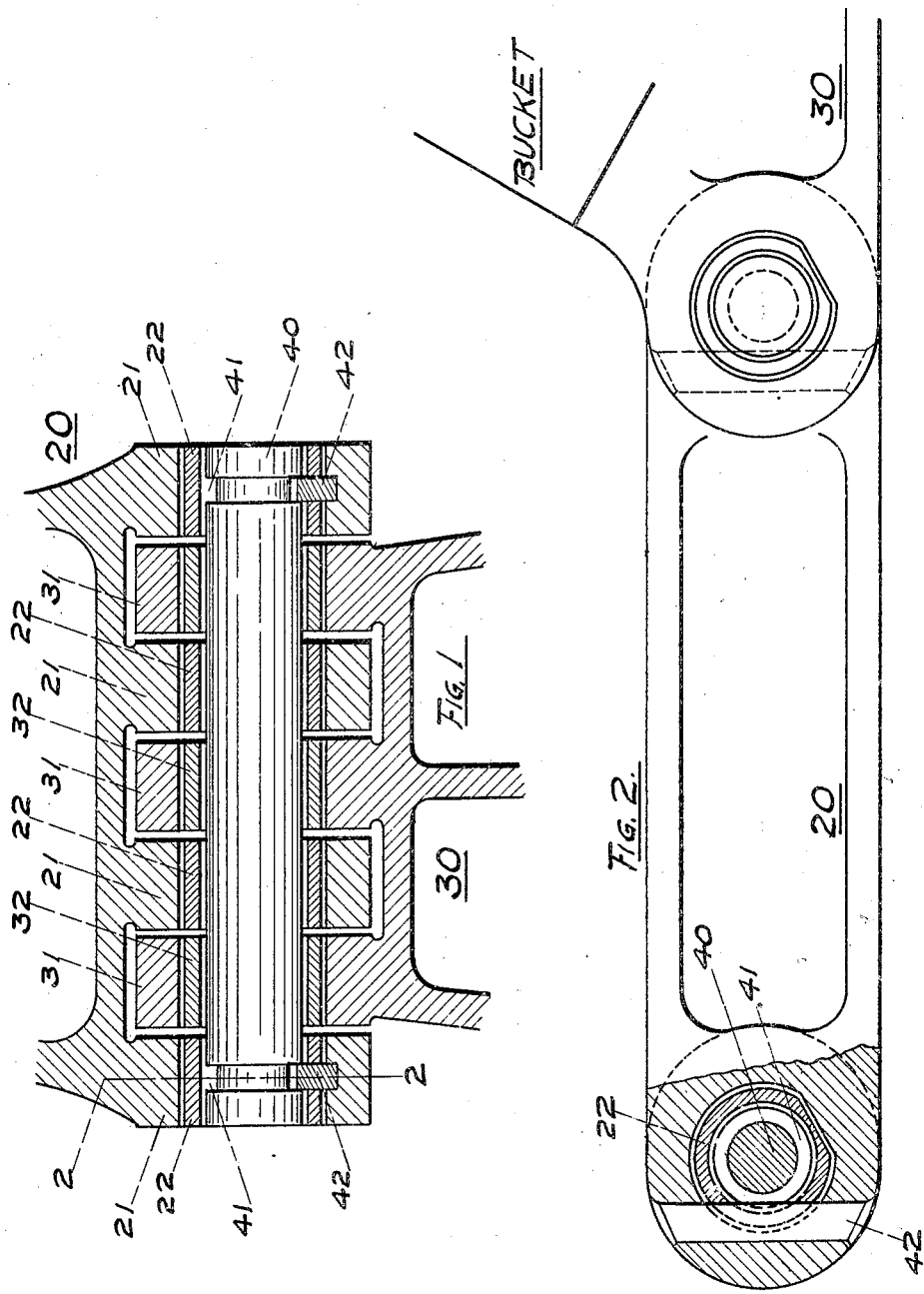
WITNESSES:
E. L. Voy.
G. B. Shipley
L. P. Martin INVENTOR
BY
G. F. Dewein ATTORNEY.

UNITED STATES PATENT OFFICE.

LUDOLPH P. MARTIN, OF MILWAUKEE, WISCONSIN, ASSIGNOR TO ALLIS-CHALMERS COMPANY, OF MILWAUKEE, WISCONSIN, A CORPORATION OF NEW JERSEY.

DREDGE PIN AND JOINT.

No. 845,040.

Specification of Letters Patent.

Patented Feb. 19, 1907.

Application filed June 28, 1905. Serial No. 267,382.

*To all whom it may concern:*

Be it known that I, LUDOLPH P. MARTIN, a citizen of the United States, residing at Milwaukee, in the county of Milwaukee and State of Wisconsin, have invented certain new and useful Improvements in Dredge Pins and Joints, of which the following is a specification.

This invention relates to a flexible joint between adjacent links of a dredge-chain, and especially to such a means where the link-pin is free to turn and yet is prevented from end displacement.

The object of the invention is to produce a connection which is simple, efficient, and devoid of projecting locks and other means, and yet which is readily assembled or disconnected.

In the drawings, Figure 1 is a sectional view on the center line of the link-pin of the joint between two adjacent links fragmentarily shown. Fig. 2 is a side elevation, partly in section on line 2 2, Fig. 1, of two links and two joints.

The chain is composed of links, which, as shown, may be alternately plain links 20 and bucket-links 30, or the links may be all of one kind. As the invention is illustrated in connection with a dredge-chain, the bucket-links 30 are shown and for convenience alternating with plain links 20.

The links have eyes 21 31. The eyes have cored perforations in alinement and of non-circular shape. In the drawings they are shown as circular with a portion of their walls flattened to a plane surface. Into these perforations are loosely fitted bushings 22 32 of an external configuration like that of the perforations in the eyes, except slightly smaller. These bushings are of tough and hard material, preferably manganese-steel.

The bushings 22 32 are cylindrical within, and when the links 20 30 are in proper relative position the eyes 21 31 are in alinement, so that a continuous cylindrical chamber is formed by the series of bushings.

Within the bushings 22 32 is passed a steel link-pin 40, and its extremities are flush with the outer surface of each outside eye 21, as shown. The pin 40 is provided with annular grooves 41 41, preferably of rectangular section, near its extremities and preferably opposite the center of the outside eyes 21.

A hole, preferably rectangular, is formed in the outside eyes 21 of the links 20 in the central plane of the eyes transverse to the link-pin axis. This hole is so located as to intercept both the outside bushings 22 and the cylindrical space within them. The hole is of the same width as the grooves 41 in link-pin 40. Pins 42 are driven into these holes and riveted at both ends firmly in outside eyes 21. These pins 42 serve to lock the link-pin 40 from end displacement, although permitting the link-pin to rotate freely. There being two such locking-pins 42 and their location being in the end eyes 21, they also serve to lock the bushings 22 32 from end displacement. The bushings are prevented from turning by their non-circular outer configuration, and their location in similarly-shaped perforations in the eyes of the links.

The locking-pins 42 are shown of rectangular configuration, so as to prevent even the slightest endwise displacement of the link-pin 40 even after considerable circumferential wear; but the pins 42 may be round with nearly as efficient action.

In the drawings the clearance has been shown exaggerated for convenience.

It is to be understood that it is not desired to be limited to the exact details of construction shown and described, for obvious modifications will occur to a person skilled in the art.

What is claimed is—

1. A pair of links, a grooved pin free to turn in each link, and means coacting with the groove to prevent end displacement of the pin.

2. In a chain, adjacent links, a link-pin free to turn in each link and pivotally connecting the links, there being a groove in the link-pin adjacent an end thereof, and means coacting with the groove for preventing end displacement of the link-pin.

3. A pair of links having a plurality of spaced alined eyes, a link-pin in the eyes and free to turn in each link, and means in an outside eye for locking the pin against end displacement.

4. In a chain, adjacent links, a link-pin pivotally connecting the links, bushings between the link-pin and links, there being an annular groove in the link-pin and means extending into a link, a bushing and the groove for preventing end displacement of the bushing and link-pin.

5. In a chain, adjacent links, there being eyes on the links, a bushing in each eye, a link-pin extending through the bushings and pivotally connecting the links, there being an annular groove in the link-pin adjacent both ends, and means extending into the outside eyes, the outside bushings and the grooves for preventing end displacement of the bushings and link-pin.

6. In a chain, adjacent links, there being eyes on the links, a bushing in each eye keyed from rotation by external non-circular configuration, a link-pin free to rotate extending through the bushings and pivotally connecting the links, there being a groove in the link-pin adjacent both ends, and means extending into the outside eyes, the outside bushings and the grooves for preventing end displacement of the bushings and link-pin.

In testimony whereof I affix my signature in presence of two witnesses.

LUDOLPH P. MARTIN.

Witnesses:
W. N. TANNER,
JOHN DAY, Jr.